Oct. 14, 1969          A. O. LUNING          3,471,932
MOUNTING DEVICE FOR TELESCOPE SIGHT AND GUN WITH
AZIMUTH AND ELEVATION ADJUSTING MEANS
Filed Dec. 15, 1967          3 Sheets-Sheet 2

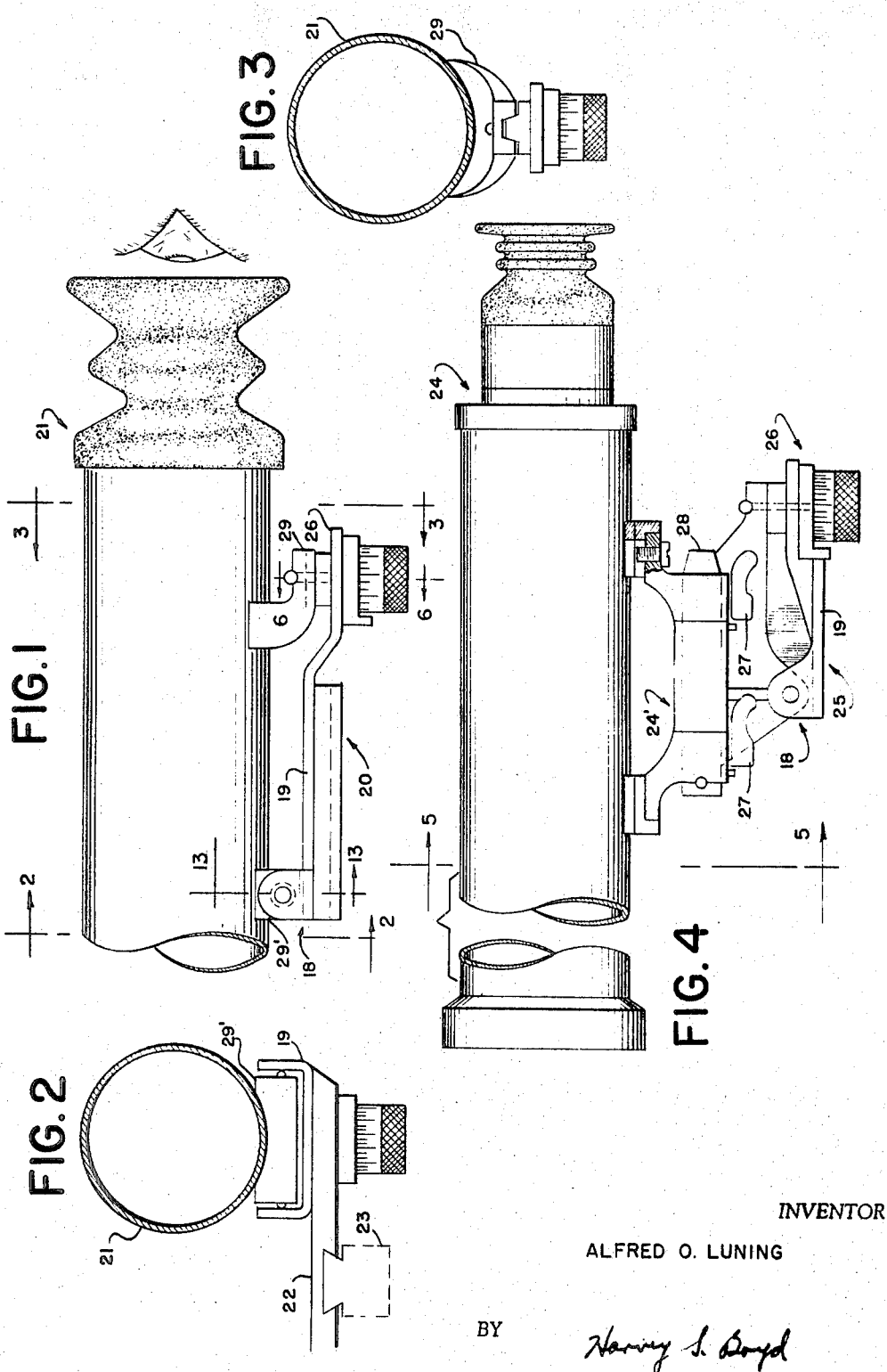

*INVENTOR*
ALFRED O. LUNING
BY    Harry S. Boyd
*ATTORNEY*

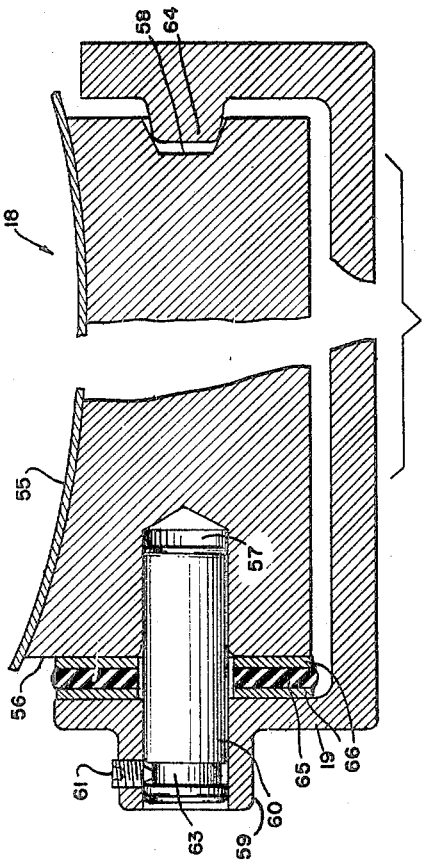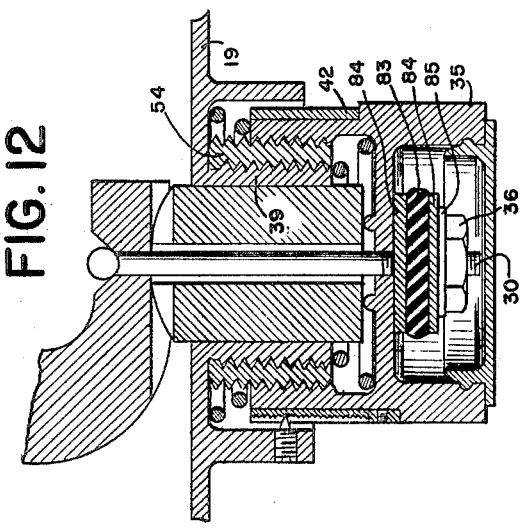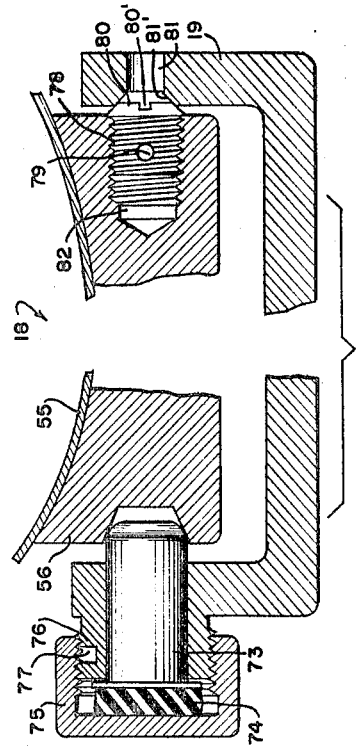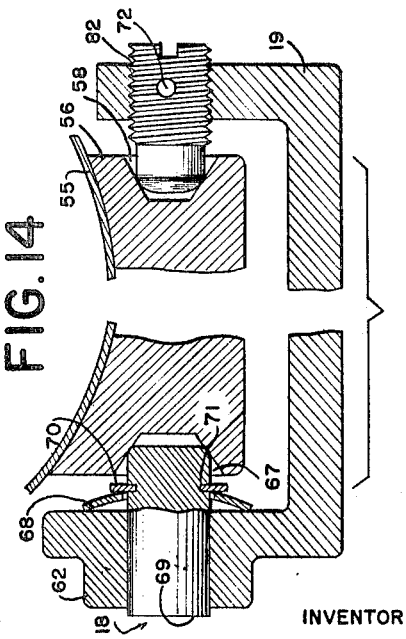
INVENTOR
ALFRED O. LUNING

United States Patent Office 3,471,932
Patented Oct. 14, 1969

3,471,932
MOUNTING DEVICE FOR TELESCOPE SIGHT AND GUN WITH AZIMUTH AND ELEVATION ADJUSTING MEANS
Alfred O. Luning, Oxon Hill, Md.
(7401 Oxon Hill Road, Washington, D.C. 20021)
Filed Dec. 15, 1967, Ser. No. 690,890
Int. Cl. F41g 1/38, 1/42
U.S. Cl. 33—50                                7 Claims

ABSTRACT OF THE DISCLOSURE

This invention relates to an adapter for mounting a telescope or a telescopic sight on a gun or rifle. The adapter of this invention utilizes a tension biased mount to eliminate lateral and vertical wobble and to provide self compensation for wear between the principal moving parts. Positive stability is achieved by widely separated rear elevation and forward deflection assemblies within the adapter. The versatility and stability of the adapter of this invention enables its use on either flat or low trajectory weapons to provide the elevation and azimuth adjustments for an integrally mounted telescope or an extra elevation and deflection capability for adapting a telescopic sight to a low trajectory weapon.

---

The invention described herein may be manufactured and used by or for the Government for governmental purposes without the payment to me of any royalty thereon.

BACKGROUND OF THE INVENTION

Field of the invention

This invention comprises a sight mount adapter having both elevation and deflection capability which may be used either as a telescope mount or as a telescopic sight adapter. The adapter of this invention may be used either with a flat or a low trajectory weapon to provide a simple, stable mount.

Description of the prior art

The gun sight adapters presently used with telescopes having built in elevation and azimuth corrections are utilized on flat trajectory weapons, and are generally fixed and immovable because such weapons require relatively small sight corrections. However, if the same sight is to be adapted for use with a low trajectory weapon additional provisions for azimuth and elevation corrections are necessary. The prior art does not disclose a stable adapter having elevation and azimuth correction capabilities for mounting a telescopic sight to a weapon which also may be used as an integral unit to mount a telescope.

SUMMARY

This invention is designed to provide a stable adapter having a rear elevation adjustment incorporated in a biased tension mount and a forward pivot mount having a lateral deflection capability.

Accordingly, it is an object of this invention to provide a stable sight mount for use with either a telescope or as an adapter for mounting a telescopic sight.

It is another object to provide a sight mount with means to eliminate lateral and vertical looseness and provide self-compensation for wear of the principal moving parts.

It is another object to provide a relatively simple and inexpensive sight adapter capable of mounting a wide variety of sights and telescopes to both flat and low trajectory weapons.

It is a further object to provide an adapter having three major elements: a forward, deflection assembly, a rear elevation assembly, and an interconnecting bridging bracket for independent spacing and functioning of the forward and rear assemblies to achieve any degree of separation desired.

These and other objects will be readily apparent with reference to the drawings and following description.

BRIEF DESCRIPTION OF THE DRAWINGS

FIG. 1 is a side view of the sight adapter of this invention used as a telescope mount;
FIG. 2 is a sectional view along line 2—2 of FIG. 1;
FIG. 3 is a sectional view along line 3—3 of FIG. 1;
FIG. 4 is a side view of the sight adapter of this invention mounting a detachable telescopic sight;
FIG. 12 is a fourth embodiment partly in section of the elevation mechanism of FIG. 6;
FIG. 13 is a partial section along line 13—13 of FIG. 1 to show the pivoting mechanism of the sight adapter;
FIG. 14 is a second embodiment partly in section of the pivoting mechanism of FIG. 13;
and
FIG. 15 is a third embodiment partly in section of the pivoting mechanism of FIG. 13.

DESCRIPTION OF THE PREFERRED EMBODIMENTS

Figure 5:
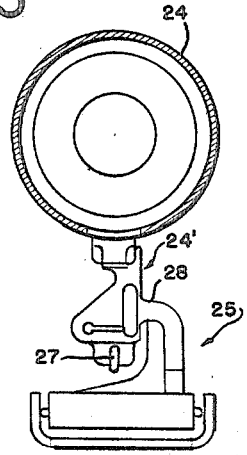
FIG. 5 is a sectional view along line 5—5 of FIG. 4.

As shown in FIG. 1, a telescope 21 may be integrally attached to the sight adapter of this invention 20. The sight adapter consists of three principal groups. The forward group consists of a laterally adjustable, rotating mechanism, as shown in FIG. 13. The rear group, or elevating mechanism, shown in FIG. 6, operates to raise and lower the telescope 21 about the forward group which acts as a pivot. The third group is a connecting bracket 19 which acts as a bridge between the forward and rear groups. Dovetail member 22 is attached to bracket 19 for mounting the adapter and telescope as a single unit on a gun having a mating dovetail 23. Members 29 and 29' connect the forward and rear groups to telescope 21.

FIGS. 4 and 5 show the side and end views of a second telescope 24 having a prior-designed fixed mounting bracket 24'. This combination in turn is mounted to a second embodiment of the sight adapter 25. Thumbscrews 27 attach the telescope 24 to slide member 28.

Figure 6:
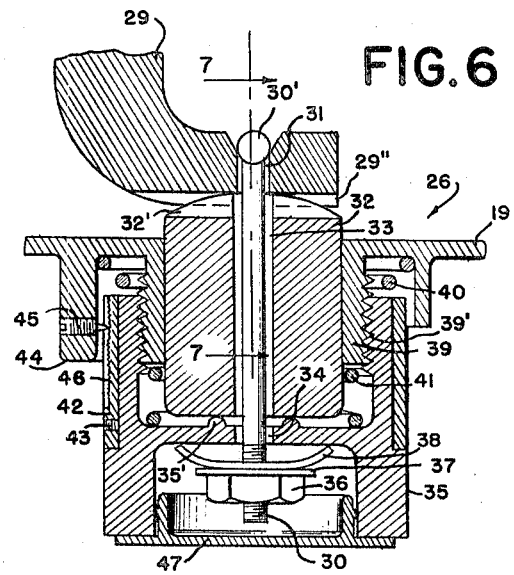
FIG. 6 is a partial setcional view along line 6—6 of FIG. 1 to show in detail the elevating mechanism.

FIG. 6 is a partial sectional view of an embodiment of the elevation mechanism 26. Telescope member 29 is secured by rod 30' through hole 31 to the bridging bracket 19 by passing through hole 33 in piston 32 and hole 34 in knob 35. The end thereof is secured to knob 35 by locknut 36, washer 37, and disked, spring washer 38. Knob 35 in turn is secured to bridging bracket 19 over a screw threaded boss 39 integral with bracket 19. Compression coil springs 40 and 41 coact axially to bias knob 35 and member 29 relative to each other to eliminate any axial movement between the cooperating screw threads 39'.

Ring 42 is used for range calibration, and is secured to knob 35 by a locking set screw 43. Projecting boss 44 on bridging bracket 19 is provided to accommodate spring detent plunger 45. Plunger 45 is employed to ride in vertical serrations 46 on ring 42. The serrations 46 are spaced around ring 42 to correspond with various range settings. Cap 47 is detachably fitted over the open end of knob 35 to provide access to the interior of knob 35 for cleaning.

Figures 7, 10:
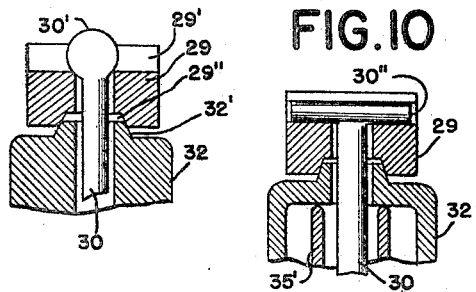
FIG. 7 is a partial sectional view along line 7—7 of FIG. 6.
FIG. 10 is a partial sectional view along line 10—10 of FIG. 9.

FIG. 7 shows in detail the attachment of rod 30 to mounting member 29. Rod 30 terminates in a spherical head 30' which rides in trough 29' on the upper surface of member 29. Piston 32 terminates in a bevelled head 32' which fits in a groove 29" on the lower surface of member 29. The coaction of head 30' in trough 29' and head 32' in groove 29" provides a tight, wobble-free junction between member 29 and piston 32.

The tightness of the elevating assembly in longitudinal and lateral directions with reference to the telescope depends on the fit between boss 39 and piston 32. Any member rigidly fastened to piston 32 will have the corresponding lateral tightness of piston 32. Member 29 being locked to the upper surface of piston 32 maintains the telescope secure in an aligned relationship with its mount because the long axis of head 32' and groove 29" is adapted to parallel the long axis of the telescope.

Rotation of knob 35 in threads 39' translates as vertical motion through protrusion 35' to piston 32. Accordingly, rotation of knob 35 causes elevation or depression of the eye end of a telescope attached to member 29.

When knob 35 is rotated and piston 32 moves vertically upward the telescope rotates in an upward arc about the forward assembly 18 as shown in FIGS. 1 and 4. This motion results in member 29 moving upward and gradually forward relative to piston 32. In order to maintain tight contact between member 29 and piston 32, the access hole 31 through member 29, piston 32, and knob 35, for rod 30, must have extra clearance to permit a small tilting motion forward of member 29 on rod 30. To permit a tight, sliding contact, disked spring washer 38 is introduced under nut 36 and washer 37 on rod 30. Without a resilient means as washer 38 the elevation assembly would bind during elevation. To further facilitate a tight fit during elevation bevelled head 32', which rides in groove 29", has an arcuate surface as shown in FIG. 6. The combination of the extra clearance of hole 31, the spring washer 38, and the arcuate shape of head 32 results in a uniform tight sliding junction between the elevating mechanism and member 29 of the telescope during elevation or depression.

To set the mounted telescope of FIGS. 1 or 4 on bore sight, the parts of the elevating mechanism are assembled except locking setscrew 43 of range calibrated ring 42 is not tightened. Knob 35 is then rotated until the line of sight of the telescope coincides with the bore of the gun. Ring 42 is then rotated until a zero range serration lies opposite the head of detent plunger 45. Setscrew 43 is then tightened, locking ring 42 to knob 35, and plunger 45 is tightened in the zero serration until it exerts the desired pressure against the serration.

Figure 8:
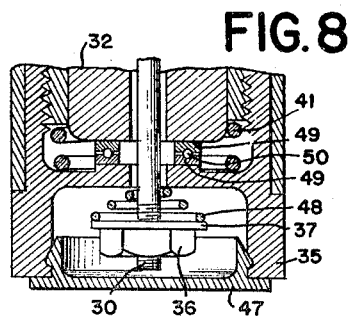
FIG. 8 shows an alternate embodiment partly in section of the elevation mechanism of FIG. 6.

FIG. 8 is an alternate embodiment of the elevating mechanism in which a coil spring 48 is substituted between washer 37 and knob 35 in lieu of spring washer 38. In addition, a thin thrust bearing comprising two flat races 49 on each side of a set of rollers 50 is interposed between piston 32 and knob 35 at their mating bottom portions to reduce friction between these members when knob 35 is rotated for various elevations.

Figure 9:
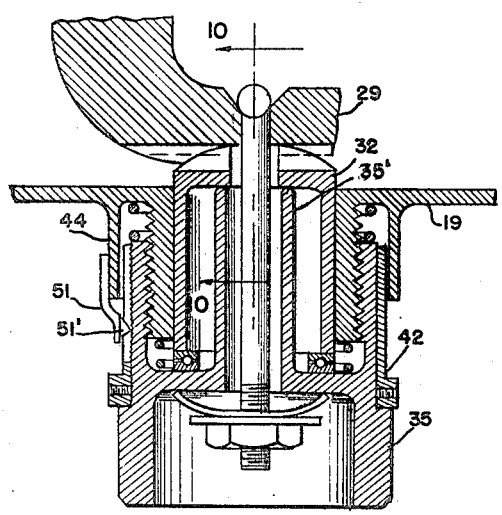
FIG. 9 shows a third embodiment partly in section of the elevation mechanism of FIG. 6.

FIG. 9 is a third embodiment of the elevating mechanism in which contact with the serrations of ring 42 is made by a leaf spring 51 having a detent 51' at the lower end to engage the serrations. The upper end of spring 51 is secured to a thin circular boss 44 in bracket 19. Piston 32 may be hollowed as shown to reduce weight. Vertical contact between knob 35 and piston 32 is made by a protruding tubular section 35'. To reduce friction the thrust bearing 49 of FIG. 8 may be interposed between the inner surface of knob 35 and piston 32 and then protruding tubular section 35' should be removed.

FIG. 10 shows that the enlarged head 30' of rod 30 may be a horizontally disposed cylinder 30" to form a T-shaped termination.

Figure 11:
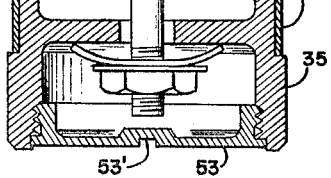
FIG. 11 shows an alternate lower portion partly in section of the elevation mechanism of FIG. 9.

FIG. 11 shows a screw threaded closure 53 at the lower opening of knob 35 with a screw driver slot 53' to facilitate installation and removal.

FIG. 12 shows a fourth embodiment of the elevating mechanism. This embodiment adds two improvements. The first improvement is a resilient member 83 in the form of an elastomer sandwiched between two washers 84 and disposed between lock washer 85 and nut 36 at the end of rod 30 in place of springs 38 of FIG. 6 or 48 of FIG. 8.

The second improvement is the introduction of an intermediate threaded ring bushing 54 between lip 39 and knob 35. Bushing 54 permits adaptability in that the inner threads may always accommodate threads of lip 39 while the external threads accommodate the threads of knob 35. Therefore, the pitch of the outer threads of bushing 54 need not be the same as the inner threads and may be varied to correspond to the range of the particular gun used and the range scale of ring 42. For example, in one weapon 12 threads per inch may be necessary to achieve the proper range setting on ring 42 while in another having a different trajectory 8 threads per inch may be sufficient. To adapt the elevation device to the second weapon a new bushing 54 may be substituted with the proper outer thread spacing and a new ring 42 calibrated with spaced serrations corresponding to the proper range setting for the weapon. These two parts may be provided in a simple and inexpensive adapter kit. By interchanging only two parts the entire telescope and sight adapter assembly may be used on a variety of different weapons.

FIG. 13 shows a sectional view of the forward assembly 18 common to the embodiments of either FIG. 1 or FIG. 4. Telescope casing 55 may have depending a mounting block 56. Block 56 has transverse recess 57 and conical recess 58 drilled in axial alignment. Lip 59 disposed at the forward end of bridging bracket 19 is provided with a bore to receive pin 60. Pin 60 is received in recess 57 to provide a rotatable mount for telescope 55. Pin 60 is retained by setscrew 61 which extends through lip 59 into groove 63 in pin 60.

Pivot pin 64 secured internally to bracket 19 is disposed to fit in recess 58 to provide with pin 60 in recess 57, a rotatable mount securing bracket 19 to block 56.

In order to maintain a tight contact between block 56 and pin 64 a compressed elastomer washer 65 is disposed, sandwiched between two washers 66, around pin 60, between block 56, and bracket 19.

FIG. 14 is a second embodiment of the forward assembly wherein block 56 is adapted to have opposed conical recesses 67 and 58 disposed in axial alignment. Pin 69 extends through lip 62 on bracket 19 and into recess 67. Pin 69 is retained through the coaction of spring washer 68 and retaining ring 70 in groove 71 of pin 69. Pin 69 cooperates with conical recess 67 to eliminate any radial play which would result if recess 67 were cylindrical instead of conical.

Pin 82 is threadedly mounted in bracket 19 and extends through the bracket and into conical recess 58 in mounting block 56. Pin 82 provides for axial adjustability of block 56 with relation to bracket 19 for lateral or deflection adjustment of the telescope. The lateral movement is biased by spring 68. A locking means in the form of a flexible friction fitting pin 72 is used to keep pin 82 in place.

FIG. 15 shows a third embodiment of the forward assembly 18. In this embodiment cap 75 is threadedly mounted on lip 76 of bracket 19. Cap 75 encloses pin 73 which extends through bracket 19 and a biasing, compressed elastomer 74. A friction locking fitting 77 retains cap 75 on lip 76.

Pin 78 with a flexible friction fitting 79 is threadedly received in recess 82 in block 56. The head 80 of pin 78 is tapered to be received in the internal countersunk portion 81' of hole 81 in bracket 19. Hole 81 provides external access to pin 78. A conventional screw driver may be inserted through hole 81 into a slot 80' to laterally adjust the azimuth of the telescope.

Within the scope of this invention any combination of the several forward assemblies may be used with any of the various elevation assemblies, or various parts thereof may be interchanged. For example, a preferred embodiment would combine the elevating mechanism of FIG. 12 and the forward assembly of FIG. 15.

The various embodiments also may be used, within the scope of this invention to function as a stable mount for any particular device wherein a lateral or vertical adjustment capability is desired. However, it is primarily envisioned as a telescopic mount adapter having a self contained deflection and elevation adjustment for use on a wide variety of weapons.

I claim:

1. Mounting means for a telescopic sight comprising:
   (a) a first vertically adjustable mounting bracket adapted to engage a telescopic sight;
   (b) a second mounting bracket adapted to engage a telescopic sight;
   (c) a bridging bracket interconnecting said first and second mounting brackets, said bridging bracket including a U-shaped saddle rotatably engaging said second mounting bracket to permit longitudinal tilting of a telescopic sight carried thereby;
   (d) said bridging bracket carrying a depending portion adjacent said first vertically adjustable mounting bracket;
   (e) a piston slidably received within said depending portion and engaging said first vertically adjustable mounting bracket;
   (f) adjusting means engaging said depending portion for relative vertical movement of said adjusting means and said depending portion; said adjusting means engaging an end of said piston remote from said first vertically adjustable mounting bracket;
   (g) fastening means adjustably connecting said first mounting bracket, said piston and said adjusting means; and
   (h) biasing means maintaining said bridging bracket and said adjusting means in tensioned relation.

2. A telescopic sight adapter comprising:
   (a) an elevation assembly having a mounting bracket for rigid attachment to a telescope, said assembly including a piston, an end of said piston pivotally engaging the mounting bracket, a cylinder surrounding said piston, said cylinder having a base with a central aperture and a pin extending coaxially through said cylinder and piston, an end of said pin extending through said base, said pin terminating at the end adjacent the cylinder base in a biased locking means, the distal end of said pin extending from said cylinder and piston and rotatably connected to said mounting bracket, said pin joining said cylinder and piston to said bracket and said biased locking means normally urging said cylinder base into the base of said piston and the portion of said piston distal to the base into the bracket;
   (b) a forward assembly including a mounting block for rigid attachment to a telescope said block having lateral, axially aligned recesses;
   (c) a bridging bracket having a U-shaped end portion disposed to surround said mounting block, and rotatably connected to said block at the recesses therein, the rotatable connection including bias means for eliminating lateral movement of said block within the rotatable connection of said block to the U-shaped end; and the end of said bridging bracket opposite the U-shaped end slidably receiving the portion of said piston adjacent the mounting bracket, and threadedly mounting the end of said cylinder opposite the base, so that rotation of said cylinder selectively raises or lowers the mounting bracket relative to the threaded mounting end of said bridging bracket;
   (d) bias means carried by the end of said bridging bracket threadedly mounting said cylinder for normally urging the base of said cylinder away from said bridging bracket.

3. The sight adapter of claim 2 further comprising:
   (a) a range calibration ring surrounding the external wall of said cylinder and fixedly secured thereto, said ring having mutually spaced serrations disposed perpendicular to the rotational path of said cylinder in the threaded mounting of said bridging bracket;
   (b) a biased detent mounted on said bridging bracket adjacent said ring, said detent disposed to ride in the serrations as said cylinder rotates in said threaded mounting and normally urged toward said ring to identify the serration corresponding to a preselected range.

4. The sight adapter of claim 2 wherein opposing, first and second rods are disposed internally to the U-shaped end of said bridging bracket in axial alignment, each of said rods engaging said mounting block at the recesses when said U-shaped end surrounds said block; said first rod carrying a biasing member for normally urging said rod axially against the walls of a recess in said block, and said second rod adjustably urging said block against said first rod.

5. The elevation assembly of claim 2 wherein said piston terminates in an arcuate head for pivotally engaging a groove in the mounting bracket, the groove disposed transverse to the long axis of said telescopic sight.

6. The sight adapter of claim 2 wherein the cylinder mounting portion of said bridging bracket further includes a threaded intermediate ring bushing disposed between said bridging bracket and said cylinder for connecting said cylinder to said bridging bracket in a threaded mounting.

7. The sight adapter of claim 2 wherein a thrust bearing is disposed between the cylinder base and the proximal end of said piston.

References Cited

UNITED STATES PATENTS

| | | |
|---|---|---|
| 691,248 | 1/1902 | De Zeng. |
| 2,165,796 | 7/1939 | Humeston. |
| 2,951,292 | 9/1960 | Buehler. |

SAMUEL S. MATTHEWS, Primary Examiner